C. D. EHRET.
SIGNALING BY ELECTRORADIANT ENERGY.
APPLICATION FILED DEC. 5, 1904. RENEWED JUNE 6, 1911.

1,018,555.

Patented Feb. 27, 1912.
2 SHEETS—SHEET 1.

Witnesses
Inventor
Cornelius D. Ehret

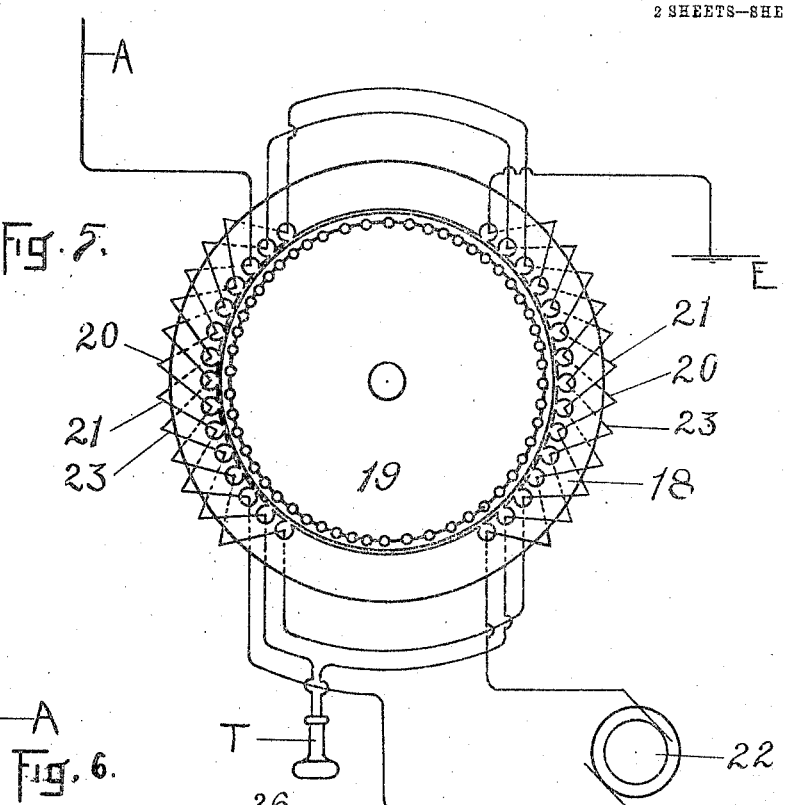
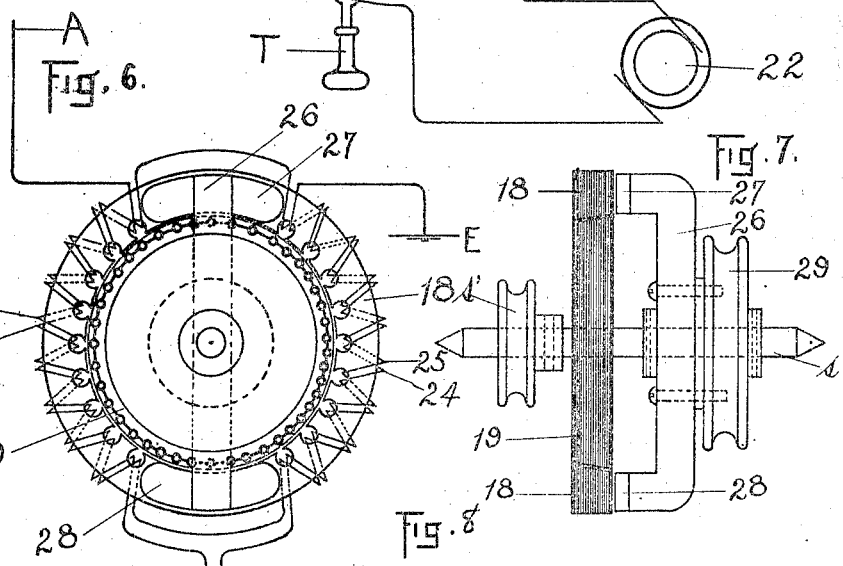
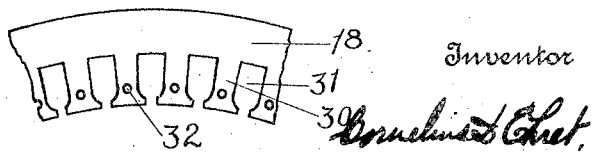

UNITED STATES PATENT OFFICE.

CORNELIUS D. EHRET, OF ARDMORE, PENNSYLVANIA.

SIGNALING BY ELECTRORADIANT ENERGY.

1,018,555.   Specification of Letters Patent.   Patented Feb. 27, 1912.

Continuation of application Serial No. 183,459, filed December 2, 1903. This application filed December 5, 1904, Serial No. 235,430. Renewed June 6, 1911. Serial No. 631,567.

*To all whom it may concern:*

Be it known that I, CORNELIUS D. EHRET, a citizen of the United States, residing at Ardmore, in the county of Montgomery and State of Pennsylvania, have invented new and useful Improvements in Signaling by Electroradiant Energy, of which the following is a specification.

My invention relates to signaling systems, more especially those in which the messages or signals are transmitted in the form of electro-radiant energy and reproduced at the receiving station.

My invention has for its object the improvement of wireless telegraph signaling systems, to the end that signals or messages may be transmitted over greater distances than heretofore, though the amount of energy transmitted and the sensitiveness of the wave-responsive device or detector remain the same.

My invention resides in a booster or reinforcer whose magnetic circuit is acted upon by the received high frequency oscillations, the booster thus operating as wave-responsive device and reinforcer.

My invention resides also in the art or process of signaling through space as hereinafter disclosed and claimed.

As is well understood in the electrical art, if an alternating current of a definite frequency be passed through the field winding or primary winding of an induction generator, and if the rotor or secondary be revolved at a speed above synchronism for that particular alternating current, the alternating current is boosted or reinforced, the mechanical energy consumed in driving the rotor at a speed above synchronism being transformed, to a considerable extent, into the energy of an alternating current whose frequency is that of the current passed through the field or primary winding. The induction generator is not self exciting and therefore the alternating current must be produced or furnished by some other means which may be known as a "frequency setter."

Figure 1:
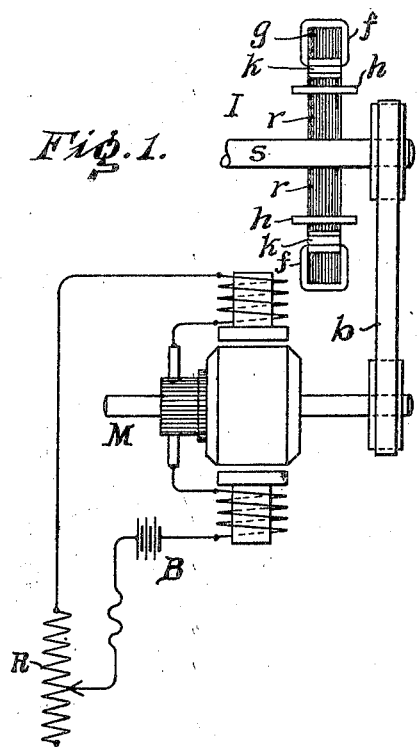
Figure 2:
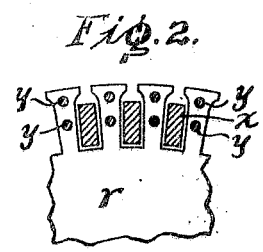
Figure 3:
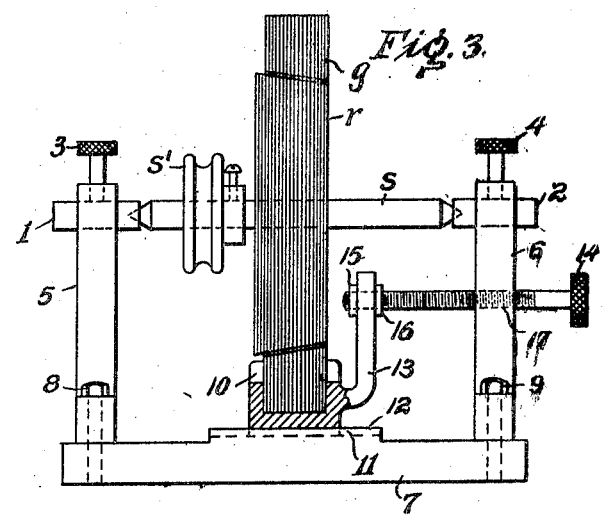
Figure 4:
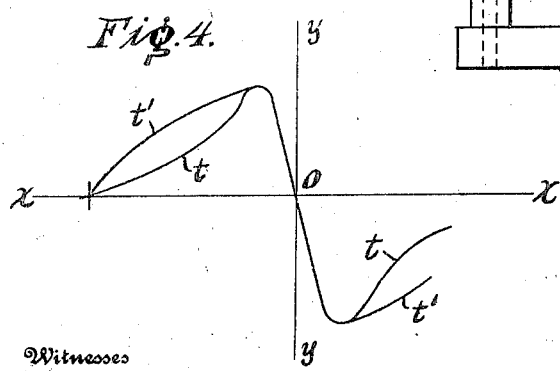

Referring to the accompanying drawing: Figure 1 is a sectional view of the induction booster, the driving motor being shown diagrammatically. Fig. 2 is a fragmentary view of a rotor which may be employed in the induction generator, showing a plurality of windings. Fig. 3 is a side elevation, partly in section, of rotor and stator of the induction generator, showing means for adjusting the air gap. Fig. 4 is a graphical representation of behavior of an induction motor and induction generator. Fig. 5 is a diagrammatic view of a wireless telegraph receiver consisting of a combined magnetic hysteresis detector and induction generator. Fig. 6 is a diagrammatic view of a modified form of combined magnetic hysteresis wireless telegraph detector and induction generator. Fig. 7 is a side view of a portion of Fig. 6 showing relation of induction generator and revolving magnet. Fig. 8 is a fragmentary view of an arrangement of slots or tunnels which may be employed in connection with the receivers of Figs. 5 and 6.

Referring to Fig. 1, $s$ is a shaft for rotating the rotor $r$ carrying in or near its periphery numerous copper bars or conductors $h$ located in slots or tunnels and all electrically connected together at their ends. Sheet iron stampings in annular form and supported on the shaft $s$ by a spider or otherwise constitute the magnetizable portion of the rotor $r$. The stator or primary comprises the annular iron stampings $g$ having slots or tunnels $k$ in which are wound the conductors $f, f$. The induction generator herein shown is bipolar, but it is obvious that multipolar windings may be employed to advantage. Inasmuch as the energy to be amplified is of relatively slight amount, the induction generator is also relatively small, and but few stampings are employed, rendering the dimensions in a direction parallel to the shaft $s$ relatively short. The amount of iron in the magnetic circuits is relatively small and of such cross section that the iron is not saturated, so that relatively great magnetic effects are produced with the very weak magnetizing currents available. The air gap between rotor and stator is as small as possible. The conductors $h$ may be of silver, and of whatever metal, are short circuited at their ends by very low resistance cross connections. The windings $f, f$, are preferably of wire insulated with cellulose acetate so as to occupy a minimum of space and thereby contribute to minimizing the lengths of the magnetic circuits, especially in the teeth or lugs between slots or tunnels, where the magnetic density is greater than at other points. To drive the rotor at a practically critical speed, because at other speeds the boosting or reinforcing effect is not so great, some regulatable means is employed such as the motor M.

B is a source of energy and R is an adjustable resistance for carefully regulating the speed of the motor M, which drives the rotor $r$ by the belt $b$. The resistance R is adjusted to the point where the sound in the telephone T is loudest and most suitable.

On reference to Fig. 4, the curve $t$ is the torque curve, roughly represented, of a single phase induction motor or induction generator whose rotor winding is made to have very low resistance. Distances in the direction of the X axis represent rotor speeds while distances in the direction of the Y axis represent torque. The curve starts at the left with the zero value of torque at standstill rest. As the rotor approaches synchronous speed the torque increases to a maximum, and as synchronism is more clearly approached falls off rapidly and becomes zero at synchronous speed. When the rotor is driven above synchronism, however, the torque increases rapidly to a maximum negative value, that is, the device acts as a generator and develops electrical energy. As the speed is still further increased the torque again falls off. This negative maximum region is seen to be relatively narrow, or in other words, relatively small changes in speed will cause a great falling off in the negative torque. The induction generator must therefore, when having very low resistance rotor winding or windings, be driven at a practically critical speed. I prefer, however, in some cases, to use in place of the very low resistance rotor winding or windings, a rotor winding or windings of greater resistance, for in that case, the torque curve becomes flatter topped as shown by the curve $t'$. In this case the induction generator is less efficient, but the rotor need not be driven at so closely a constant speed to insure the maximum reinforcing effects. The efficiency is a minor consideration since at best relatively slight amounts of energy are required and it is not a question of cost or power. Such higher resistance rotor winding or windings may be obtained by using silver or copper conductors of relatively small cross sections, or a higher resistance material, such as iron or German silver may be used.

In place of using a single rotor winding, a plurality of rotor windings may be employed as shown in Fig. 2. In small machines, such as required for this purpose, the number of rotor slots or tunnels may be relatively small per pole of stator and thus cause a slightly uneven reinforcement. In Fig. 2 $x$ represents the principal rotor winding located in the slots between the teeth. In addition to these, however, I prefer to use another winding $y$ threaded through the top of each tooth, or through the top and body of each tooth. The winding or windings $y$ are also short circuited as in case of the winding $x$. The effect then is to get a smooth reinforcement because between adjacent principal conductors $x$ are located also the auxiliary conductors or windings $y$. It may be desirable also to provide means for inserting in the rotor winding or windings a resistance which may be varied at will in order to secure adjustment for different reinforcing effects. Such resistances may be inserted in the well known manner as employed in connection with induction motors employed in the electrical transmission of power.

In Fig. 3 $g$ represents the stator of an induction generator, in section, and $r$ represents the rotor mounted on the shaft $s$ and driven by the pulley $s'$. It is to be noticed that the circular opening in the stator $g$ to receive the rotor $r$ is in fact tapered or conical in outline. The periphery of the rotor $r$ also tapers and is of conical form, the taper of the rotor $r$ and the opening in the stator $g$ is the same. In the induction generators used herein I prefer this tapering construction so that the air gap between stator and rotor may be nicely varied or adjusted. The conical opening in the stator is turned or machined truly, and preferably ground true. The periphery of the rotor is also truly turned or machined and preferably ground true. Then by relative shifting of the rotor and stator, the air gap may be increased or diminished, and the parts so adjusted that a minimum air-gap may be utilized. The rotor is made of somewhat greater thickness than the stator in a direction parallel with the shaft $s$. The shaft $s$ has conical bearings in the pieces 1 and 2 which are held by nuts or screws 3 and 4, and adjustable in, the standards 5 and 6 which are secured to the base 7 by screws or bolts 8 and 9. The stator $g$ is held in an arc-shaped member 10 which engages by a dove-tail 11 in a dove-tail slot 12 in the base 7. 13 is a bracket or arm secured to the member 10, and in this arm 13 the adjusting screw 14 may rotate freely between the collars 15 and 16 secured to said screw. The screw threads of 14 engage the tapped hole 17 in the standard 6. By turning the screw 14 by its milled head the stator $g$ may be moved backward and forward in a direction parallel with the shaft $s$, thus increasing or diminishing at will the air gap of the induction generator and thus adjusting or varying the magnetic leakage or other effects. By this accurate grinding of rotor and stator, the air gap may be maintained at a minimum, and by the tapering arrangement a nice adjustment is obtained. For clearness the windings have been omitted from Fig. 3.

In Fig. 5 is shown a combined magnetic hysteresis wireless signaling receiver and induction generator. A represents the usual aerial conductor or conductors between which and the earth connection E is connected one winding of the stator 18, the rotor being shown at 19. This winding is designated by the numeral 20 and passes through every third slot or tunnel in the stator 18. Another winding 21 passes through another set of tunnels or slots of the stator 18, and there is included in series with such winding a source of alternating or fluctuating currents 22. In still another set of tunnels or slots in the stator 18 is placed the winding 23 in series with which is connected the telephone receiver T. The alternating generator 22 in conjunction with the winding 21 serves to cyclically magnetize the material of the stator 18 at a frequency which is low as compared to the rate of succession of the transmitted wave trains. This slowly alternating current does not produce a note or sound in the telephone receiver T because of its low rate. The material of the stator 18 thus exhibits hysteresis effects and the arriving energy passing through the winding 20 produces sudden variations, at wave train frequency, in the magnetism of the system. With the rotor 19 absent these sudden changes of magnetism would be recorded or rendered intelligible as in the case of the ordinary magnetic hysteresis receiver. By employing the rotor 19 however, by rotating it above synchronous speed for the transmitted wave train frequency the slight effects in the telephone receiver T are amplified or reinforced on the induction generator principle. Here we have therefore the magnetic circuit of the induction generator serving also as the circuit upon which the received oscillations act to produce changes in magnetism at a rate dependent upon the wave train frequency. Though the three windings are shown as disposed in separate sets of tunnels or slots, it is to be understood that any other method of winding may be employed, that is where a portion of each winding is placed in each slot or tunnel or in any other combination.

Fig. 6 is a modification of Fig. 5, there being only two windings employed, both shown to be placed in the same tunnels or slots. A represents the aerial conductor or conductors between which and the earth connection E is connected the demagnetizing or aerial winding 24. Another winding 25 is also wound through these tunnels or slots and has connected in series with it the telephone receiver T. The stator is represented by 18 and the rotor by 19. To produce the low frequency fluctuation or variation of magnetism in the magnetic circuit the magnet 26 having the pole shoes 27 and 28 is employed. This is a permanent magnet and is mounted upon the shaft s, as shown in Fig. 7, and driven by the pulley 29. The pulley $s'$ and rotor 19 are secured to the shaft s, while the magnet 26 and pulley 29 are secured to each other but run loosely on the shaft s. The pulley 29 is driven at low rate and independently of the rotor 19. The magnet 26 rotates so that the magnetic circuit of the induction generator is varied in its magnetism at a rate which is low compared with the wave train frequency of the transmitted energy; simultaneously the rotor 19 is rotated above synchronism for this wave train frequency.

Fig. 8 shows a fragment of the stator illustrating a construction which may be adopted if desired. Between the teeth 30 are the winding spaces 31 in which may be disposed a portion of the windings; and further tunnels 32 are supplied in the teeth for the reception of another or other of the windings. For example, it may be desirable to place in the tunnels 32 the aerial or demagnetizing winding while the other winding or windings is or are placed in the slots 31. In place of tunnels 32 small slots in the ends of the teeth may be employed. Obviously the means for adjusting the air gap of the induction generator or booster described in connection with Fig. 3, may be used in connection with the induction generators or boosters shown in the other figures.

This application is a continuation of my application Serial No. 183459, filed December 2, 1903.

What I claim is:—

1. In a signaling system, an induction generator, means for magnetizing the same, a winding upon the stator thereof traversed by received electrical energy, and a second winding on said stator included in a circuit containing a signal translating instrument.

2. In a wireless signaling system, receiving apparatus comprising a receiving conductor or circuit, an induction generator, a winding of said generator associated with said receiving conductor or circuit, means for magnetizing said generator, and a winding on said generator including in its circuit a signal translating instrument.

3. In a wireless signaling system, receiving apparatus comprising a receiving conductor or circuit, an induction generator associated therewith, a winding of said generator associated with said receiving conductor or circuit, an independent winding on said generator including in its circuit a signal translating instrument, means for independently magnetizing the field of said generator, means for driving said generator above synchronism.

4. In a signaling system, an induction generator, means for magnetizing the same, an adjustable air gap therefor, a winding of said generator traversed by received energy, and a signal translating instrument.

5. In combination, a receiving conductor or circuit, an induction generator, means for magnetizing the same, a winding on the stator thereof traversed by high frequency currents, a second winding on said stator, and a signal translating instrument included in the circuit of said second winding.

6. In a wireless signaling system, receiving apparatus comprising a dynamic generator, means for magnetizing the same, a winding on said generator traversed by high frequency currents derived from the received energy, a signal translating instrument, and a circuit including said instrument and associated with said generator.

7. In a wireless signaling system, receiving apparatus comprising an induction generator, means for magnetizing the same, a winding thereof traversed by high frequency currents derived from the received energy, a signal translating instrument, and a circuit including said instrument in operative relation with said generator.

8. In a wireless signaling system, receiving apparatus comprising an induction generator, means for continuously varying the magnetism thereof, a winding on said generator traversed by high frequency currents, a signal translating instrument, and a circuit including the same in operative relation with said generator.

9. In a wireless signaling system, receiving apparatus comprising a dynamic booster, means for magnetizing the same, a winding thereon traversed by high frequency currents derived from the received energy, a second winding thereon, and a signal translating instrument included in the circuit of said second winding.

10. In a wireless signaling system, receiving apparatus comprising a dynamic booster, means for magnetizing the same, a winding thereon traversed by high frequency currents derived from received energy, a second winding thereon in inductive relation to said first mentioned winding, a signal translating instrument included in the circuit of said second winding, and means for driving the rotatable member of said booster at a frequency higher than the wave train frequency of the received energy.

11. In a wireless signaling system, a dynamic generator, means for magnetizing the same, a winding traversed by currents derived from received energy for causing variations in the magnetism of said generator, and means for driving the rotatable member of said generator, whereby signal reproducing impulses of greater energy are produced.

12. In a wireless signaling system, receiving apparatus comprising a dynamo electric machine, means for magnetizing the same, a winding in the field of said dynamo electric machine traversed by received energy, a signal translating instrument, and a circuit including said instrument and controlled by said dynamo electric machine.

13. In a wireless signaling system, receiving apparatus comprising an alternating current dynamo electric machine, means for magnetizing the same, a winding in the field of said dynamo electric machine traversed by received energy, a signal translating instrument, and a circuit including said instrument controlled by said dynamo electric machine.

14. In a wireless signaling system, receiving apparatus comprising a dynamo electric machine, a winding on said machine traversed by fluctuating current, a second winding in the field of said dynamo electric machine traversed by received energy, a signal translating instrument, and a circuit including said instrument controlled by said dynamo electric machine.

15. In a wireless signaling system, receiving apparatus comprising a dynamo electric machine, a winding thereon traversed by alternating current, a second winding in the field of said dynamo electric machine traversed by received energy, a signal translating instrument, and a circuit including said instrument controlled by said dynamo electric machine.

16. In a system employing electro-radiant energy, receiving apparatus comprising a dynamo electric machine, means for magnetizing the same, a winding on said machine traversed by current in response to received energy, a signal translating instrument, and a second winding on said machine included in circuit with said signal translating instrument.

17. In a signaling system employing electro-radiant energy, receiving apparatus comprising a synchronous alternating current dynamo electric machine, means for magnetizing the same, a winding on said machine traversed by current in response to received energy, a signal translating instrument, and a second winding on said machine included in circuit with said signal translating instrument.

18. As an improvement in the art of rendering intelligible signals or messages transmitted through the natural media as electro-radiant energy, the method which consists in transforming the received electro-radiant energy into the energy of electric currents or charges, changing or varying the magnetism of a magnetic field by such currents or charges, and dynamically generating by said changed or varied magnetism current of greater energy than that of the received electro-radiant energy.

19. As an improvement in the art of rendering intelligible messages or signals represented in transmission by electro-radiant energy, the method which consists in transforming the received electro-radiant energy into the energy of electric currents or charges, causing said currents or charges to change or vary the magnetism of a varying magnetic field, and dynamically generating from said varying or changing magnetism a current of greater energy than the received electro-radiant energy.

20. As an improvement in the art of rendering intelligible messages or signals represented in transmission by electro-radiant energy, the method which consists in producing a varying magnetic field, transforming the received electro-radiant energy into the energy of currents or charges, causing said currents or charges to cause impulses in the magnetism of said varying magnetic field, and dynamically generating current impulses corresponding with said impulses in the varying magnetic field, said generated currents having an energy greater than the received electro-radiant energy.

21. As an improvement in the art of rendering intelligible messages or signals represented in transmission by electro-radiant energy, the method which consists in producing a fluctuating current, producing a varying magnetic field thereby, transforming the received electro-radiant energy into the energy of currents or charges, causing said currents or charges to vary the magnetism of said varying magnetic field, inducing by the varying magnetic field thus varied a signal producing current, and boosting said signal producing current.

22. As an improvement in the art of rendering intelligible signals or messages represented in transmission by electro-radiant energy, the method which consists in producing a varying magnetic field, transforming the received electro-radiant energy into the energy of electric currents or charges, causing said currents or charges to change or vary the magnetism of the varying magnetic field, deriving by induction from the varying magnetic field thus varied signal or message reproducing current, and dynamically boosting said inductively derived current.

23. As an improvement in the art of rendering intelligible signals or messages represented in transmission by electro-radiant energy, the method which consists in inductively relating a varying magnetic field and the currents or charges derived from the received electro-radiant energy, deriving by induction a signal or message producing current, and boosting said inductively derived current.

24. As an improvement in the art of rendering intelligible signals or messages represented in transmission by electro-radiant energy, the method which consists in subjecting a magnetic medium to the currents or charges derived from the received electro-radiant energy and to a varying magnetizing force, deriving by induction from said medium a signal or message producing current, and boosting said current inductively derived.

CORNELIUS D. EHRET.

Witnesses:
EDITH BAHN,
A. S. MARSH.